United States Patent [19]

Katoh

[11] 3,864,742

[45] Feb. 4, 1975

[54] AUTOMATIC TAPE LOADING MECHANISM FOR A RECORDING AND/OR REPRODUCING APPARATUS

[75] Inventor: Hiroshi Katoh, Yokohama, Japan

[73] Assignee: Victor Company of Japan, Ltd., Yokohama City, Kanagawa-ken, Japan

[22] Filed: June 20, 1973

[21] Appl. No.: 371,837

[30] Foreign Application Priority Data

| | | |
|---|---|---|
| June 24, 1972 | Japan | 47-63578 |
| June 24, 1972 | Japan | 47-63579 |
| June 24, 1972 | Japan | 47-63580 |
| July 20, 1972 | Japan | 47-72753 |
| July 26, 1972 | Japan | 47-74087 |
| June 24, 1972 | Japan | 47-74981[U] |
| June 24, 1972 | Japan | 47-74982[U] |

[52] U.S. Cl. .................. 360/85, 360/95

[51] Int. Cl. .................. G11b 15/66, G11b 5/52

[58] Field of Search ........ 179/100.2 ZA; 360/85, 95

[56] References Cited

UNITED STATES PATENTS 3,740,492 6/1973 Inaga .................. 179/100.2 ZA

*Primary Examiner*—Vincent P. Canney
*Assistant Examiner*—Robert S. Tupper

[57] ABSTRACT

An automatic tape loading type recording and/ or reproducing apparatus has a cylindrical tape guide including at least one rotating head. A ring-shaped structure encircles the tape guide structure and is driven in clockwise and counterclockwise motion. Tape is drawn out and the ring-shaped structure operates to move, under the guidance of a pair of arm members, to draw a tape out of a housing structure such as a cassette. A lock means separates the tape drawing out and guiding means and locks the same with the ring-shaped structure at a position to which it has revolved. Tape pulling around and guiding means moves together with the revolution of the ring-shaped structure to engage the tape, which has been drawn out of the housing. The tape is formed into a loop of approximately triangular shape. The ring-shaped structure continues to revolve further to pull around the tape and wrap the same around the peripheral surface of the cylindrical tape guide structure over a specific wrap angle.

9 Claims, 10 Drawing Figures

AUTOMATIC TAPE LOADING MECHANISM FOR A RECORDING AND/OR REPRODUCING APPARATUS

BACKGROUND OF THE INVENTION

This invention relates to a recording and/or reproducing apparatus of automatic tape loading type.

More particularly, the invention relates to an apparatus of relatively simple organization wherein a tape is wound on a spool within a cassette. A tape pulling means pulls the tape from the cassette and wraps it obliquely over a specific angular region around a guide drum having a rotating head therein. The tape drawing out and guiding means and the tape pulling around and guiding means are operated interrelatedly with the revolution of a ring-shaped structure disposed to encircle the guide drum.

In general, an automatic tape loading tape recorder of cassette type has means to draw a magnetic tape out of a cassette and wrap it over a specific angle around a guide drum having a rotating head therein. This automatic loading places the tape in a predetermined tape travel path. In an apparatus of this type, the tape drawing out and guiding means and the tape pulling around and guiding means are operated independently of each other. In the tape loading operation, the tape drawing out means is first operated to draw the tape out of the cassette and to form a tape loop of approximately triangular shape. Afterward, the tape pulling around means is operated to pull the tape along the peripheral surface of the guide drum.

While the tape loading operation is positively carried out in this known apparatus, it has had the disadvantageous tendency to become large in size and complicated in structural organization.

SUMMARY OF THE INVENTION

Accordingly, a general object of the present invention is to provide a new and useful recording and/or reproducing apparatus of automatic tape loading type, wherein the above mentioned difficulty has been overcome.

More specifically, an object of the invention is to provide a recording and/or reproducing apparatus of automatic tape loading type in which a tape guide means for causing tape drawing out and guiding means and tape pulling around and guiding means to be operated in an interrelated manner to draw a magnetic tape out of a cassette and to load the same into a specific tape path is operated by tape driving means such as a capstan. In the apparatus of this invention, a separate motor exclusively for loading is unnecessary, and the apparatus can be made small and simple.

Another object of the invention is to provide an apparatus of the type referred to above in which, by switching a driving power transmitting means in correspondence with the loading and unloading modes of operation, the tape guide means for operating interrelatedly the tape drawing and guiding means and the tape pulling around and guiding means is caused to move in forward and reverse directions responsive to a rotational driving power source rotating in only one direction. For this rotational driving power source, a member rotating in only one direction, such as the capstan shaft or the rotating guide drum shaft, can be used. In the case where a motor is to be used for the driving power source, use can be made of a motor which can rotate in only one direction.

Still another object of the invention is to provide an apparatus of the instant type in which the tape guide means positively locks the tape drawing out and guiding means in a predetermined angular position. During the loading operation, the tape drawing out and guiding means and the tape pulling around and guiding means are operated interrelatedly responsive to the movement of the tape guide means. Initially, the tape is drawn out of the cassette and to form a tape loop sufficient for entrance thereinto of the succeeding tape pulling around and guiding means.

A further object of the invention is to provide an apparatus of the instant type in which the magnetic tape is drawn out of the cassette loading operation. The tape is pulled around a helical path, and wrapped around the guide drum. The magnetic tape is engaged uniformly over its entire width. In accordance with this invention, when the magnetic tape is pulled around a helical path, a uniform tension force is produced in the tape with respect to the tape width direction.

A still further object of the invention is to provide an apparatus which functions if the tape drawn out of the cassette becomes slack, to prevent the slackened tape from being caught on the various parts of the chassis. By this provision, the loading or unloading operation can be carried out without any interference or deleterious effect due to such slackening of the tape.

An additional object of the invention is to provide an apparatus of the instant type in which the tape pulling around and guiding means which is operated interrelatedly with the movement of the tape guide means to pull the tape drawn out of the cassette around the guide drum in a helical path. The tape is thus wrapped therearound with a movement by tracing a path different from the path of movement of the tape guide means.

Further objects and features of this invention will be apparent from the following detailed description when read in conjunction with the accompanying drawings.

DETAILED DESCRIPTION

Figure 1:
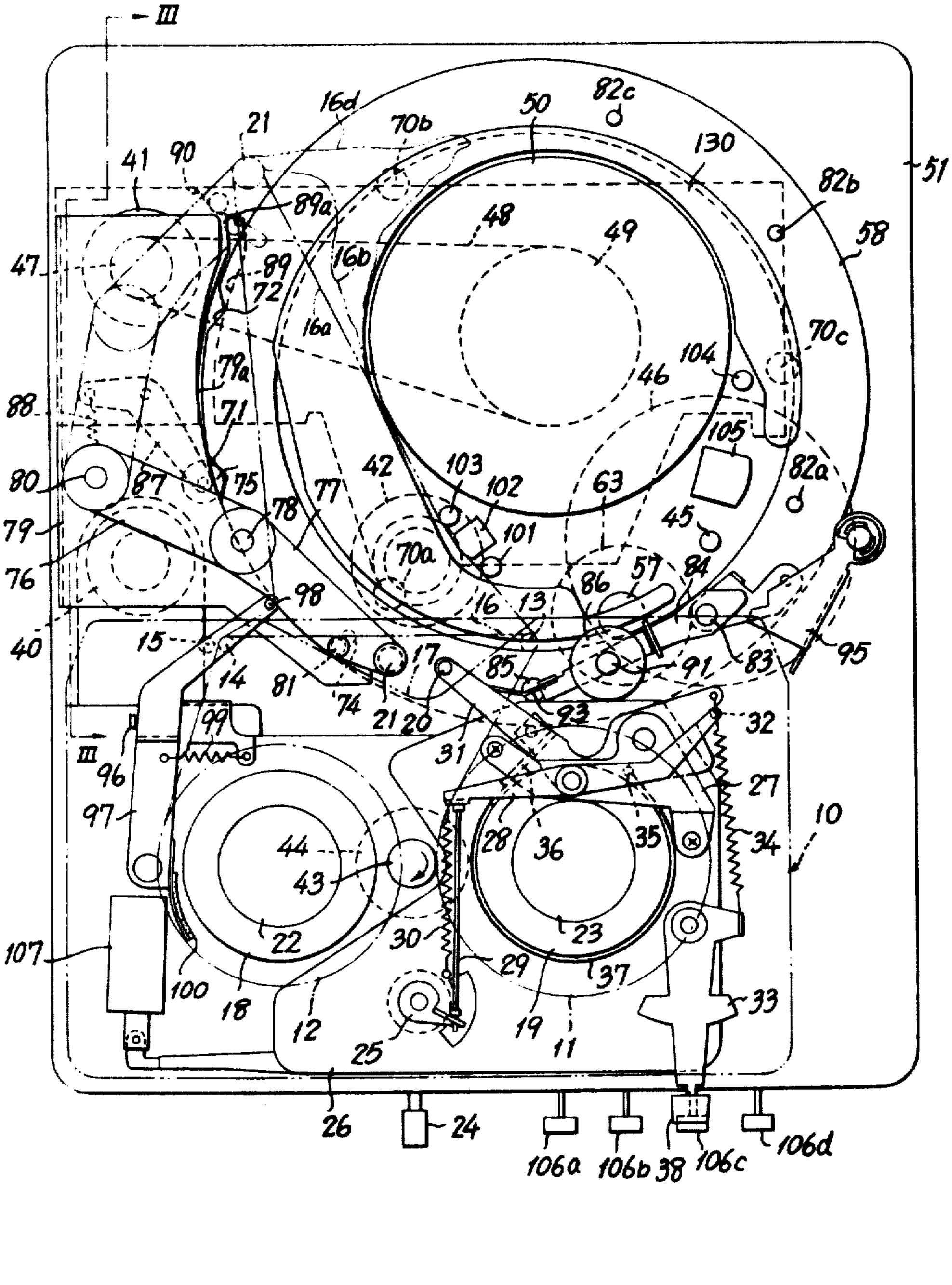
FIG. 1 is a plan view showing one embodiment of an automatic tape loading type of recording and reproducing apparatus according to this invention, shown in the state prior to tape loading.
Figure 2:
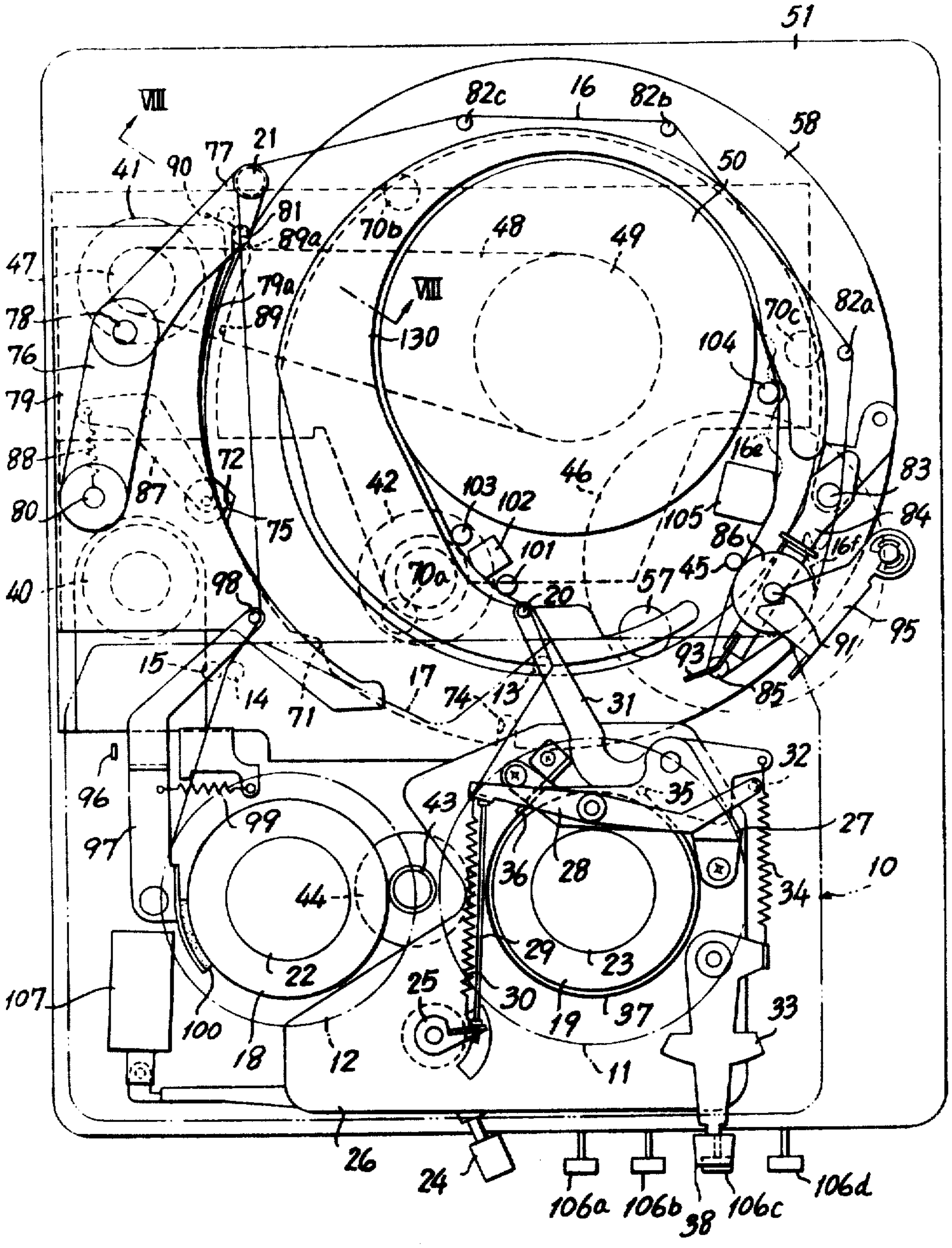
FIG. 2 is a similar plan view of the same apparatus shown in the state after tape loading.
Figure 3:
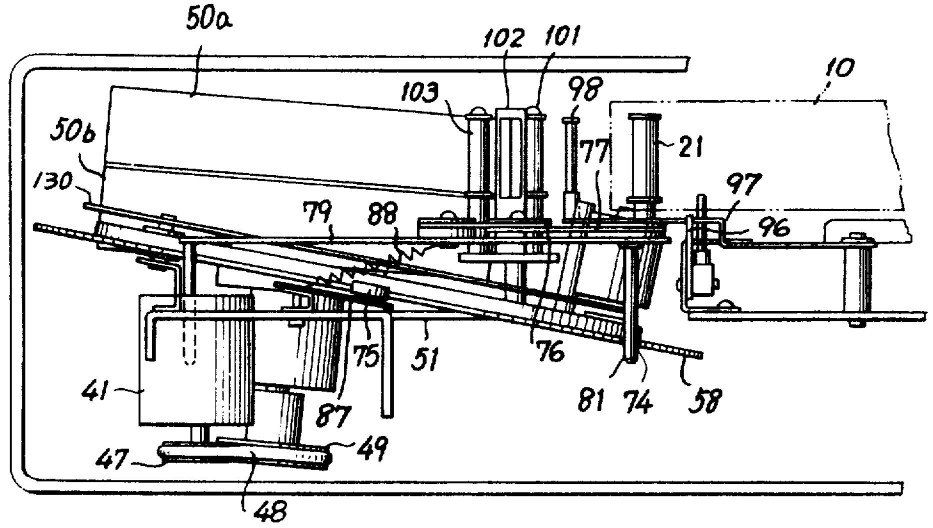
FIG. 3 is a vertical section taken along the line III—III in FIG. 1 and viewed in the arrow direction.

In FIGS. 1, 2 and 3, a tape cassette 10 contains a tape supply roll 11 and a tape take-up roll 12. Within the tape cassette 10, there are further provided tape guide pins 13, 14 and 15. A magnetic tape 16 drawn out from the tape supply roll 11 is guided by the guide pin 13, passes by the front surface of the cassette, and, passing between the pins 14 and 15, reaches the tape take-up roll 12. The cassette 10 is provided at its forward or innermost surface and bottom surface with a cut out opening 17, having a shutter cover (not shown) opened by the insertion of the cassette into loaded position within the apparatus. The shutter protects the magnetic tape 16 within the cassette when it is not being used. When the cassette 10 is mounted on the tape supply reel disc 19 and the tape take-up reel disc 18 as shown in FIG. 1, this shutter cover is held open. A tension pole 20 and a guide pole 21 are relatively inserted within the cassette opening 17. The tape supply and take-up reel discs 19 and 18 are of known arrangement. The upper reel discs 22 and 23 are respectively mounted on the upper surface with friction material interposed therebetween. In their states indicated in FIG. 1, these reel discs 18 and 19 are free to rotate.

First, the loading operation carried out by play control operation or video-audio recording control operation will be described. For play operation, a play control lever 24 is turned to the right (counterclockwise as viewed from above) to the lock position indicated in FIG. 2. For video-audio recording operation, a video-audio recording control button 106*c* is pushed in. At the same time the control lever 24 is turned in the same manner as for play operation.

This manipulation of the control lever 24 causes a connector 25 to rotate similarly in the counterclockwise direction. A lock lever 28, rotatably held on a holder 27 fixedly mounted on a sub-chassis 26, is rotated in the clockwise direction against the force of a spring 30 by a connecting rod 29 linking one end of the lock lever 28 to the connector 25. Consequently, a supply-side tension lever 31 rotatably held on the lower side of the holder 27 is released from engagement by an engagement pin 32 fixed to the lower side of the other end of the lock lever 28. Lever 31 is thereby turned clockwise by the tension force of a spring 34 stretched between the tension lever 31 and a skew control lever 33.

As one result of this rotation of the tension lever 31, the aforementioned tension pole 20 secured to the other end of the tension lever 31 is extracted from the interior of the cassette 10 through the opening 17. As it thus moves out, it intercepts the magnetic tape 16 and draws it out of the cassette. Furthermore, as another result of the rotating of the tension lever 31, a brake band 37 encircling the reel disc 19 is tightened. Band 37 is connected at its two ends respectively to a pin 35 fixed to the lever 31 and to an anchor member 36 on the subchassis 26. A braking force imparts a back tension to the magnetic tape 16 paid out from the tape roll 11 to the supply-side reel disc 19. The above mentioned skew control lever 33 is actuated by means of a knob 38 and is locked in a specific position.

As another result of the above mentioned turning manipulation of play control lever 24, an electrical circuit including a capstan motor 40 and a head motor 41 is closed. These motors 40 and 41 start to rotate. The rotation of the motor 40 is transmitted through a belt (not shown) to an intermediate pulley 42 integral with a two-stage pulley. The pulleys turn in the clockwise direction and further, through a belt (not shown), rotate a drive roller 43 and a rewind roller 44 integrally formed and a flywheel 46 connected to a capstan 45, in the clockwise direction. At this time, the drive roller 43 is pressed against the take-up side reel disc 18. A counterclockwise rotating torque is imparted to the reel disc 18.

The rotation of the head motor 41 is transmitted through a pulley 47, a belt 48, and a pulley 49 to rotate an upper guide drum 50*a* in a clockwise direction at high speed. As shown in FIG. 3, the guide drum 50 comprises a lower guide drum 50*b* fixed to the chassis 51 of the apparatus. The upper guide drum 50*a* includes a rotating video head (not shown), supported at a position slightly separated from the lower guide drum 50*b*. The head rotation is inclined so that its part confronting an erasing head 102 is at a low position.

As still another result of the aforementioned turning of the play control lever 24, an operation lever 52 is turned clockwise. The mechanism for driving the revolving ring is placed in the state indicated in FIG. 4A. A holding lever 53 is urged by the tension force of a spring 54 to rotate in the counterclockwise direction relative to a shaft 55. A loading drive roller 57, journaled on a pin 56 fixed to the holding lever 53, is pressed against the inner rim of the revolving ring 58.

As a result of the above mentioned rotation of the operation lever 52, an unloading lever 59 is placed in its disengaged state as described hereinafter, while a loading lever 60 is placed in its engaged state. Furthermore, a gear 61 is caused to mesh with both a gear 62 formed integrally with the capstan 45 and a gear 63 formed integrally with the drive roller 57 for loading. Consequently, the clockwise rotation of the capstan 45 is transmitted by way of the gears 62, 61, and 63 to rotate the drive roller 57 clockwise. The revolving ring 58 beings to revolve clockwise from the position indicated in FIG. 1.

The revolving ring 58 is rotatably held by guide rollers 70*a*, 70*b* and 70*c*, with the holding at a specific angle of inclination relative to the chassis 51. This revolving ring 58 is provided at specific points on its outer rim with V-shaped notches 71 and 72 and a U-shaped cutout 74. It is limited in revolution, at a position where a roller 75 fits into the notch 71. A first arm 76 and a second arm 77 are rotatably connected by a shaft 78. The proximal part of the first arm 76 is rotatably supported on a pin 80 fixed to a bracket 79 (crossing the ring 58 in the side view of FIG. 3). The second arm 77 supports the aforementioned guide pole 21 fixed to upper part of its distant end and a pin 81 fixed to the lower side thereof. The pin 81 extends to a position for fitting into the U-shaped cutout 74 and is prevented from disengaging from the cutout 74 by an arcuate guide surface 79*a* of the bracket 79.

The revolving ring 58 is provided on its upper surface with guide pins 82*a*, 82*b* and 82*c* and a pivot pin 83 fixed thereto. A pinch roller supporting lever 84 is pivoted on the pin 83 and is urged to turn in the counterclockwise direction by a torsion spring. However, it is limited from thus turning, at the position indicated in FIG. 1. This lever 84 is provided at its distant end with a tape guide pole 85 and at approximately its middle part with a pinch roller 86.

Figure 6:
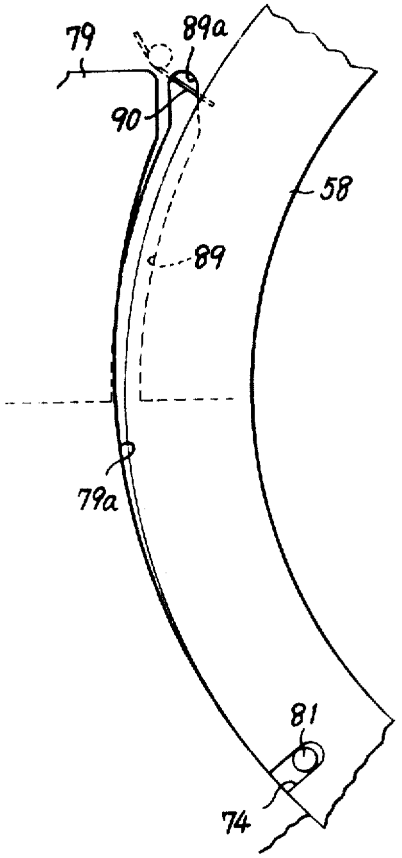
FIGS. 6 and 7 are enlarged, fragmentary plan views respectively showing one example of a mechanism for locking a tape drawing out means in the apparatus in inoperative and operative states.

As the revolving ring 58 begins to rotate, an approximately L-shaped lever 87, holding the aforementioned roller 75 at the end of one of its arms, is rotated clockwise against the force of a spring 88. Thereupon, the roller 75 is disengaged from the V-shaped notch 71 and pressed against the outer peripheral surface of the ring 58. The pin 81, fitted in the U-shaped cutout 74, moves together with the revolving of the ring 58 as it is guided by the arcuate guide surface 79*a*, as indicated in FIG. 6. Consequently, the first arm 76 is rotated in the counterclockwise direction relative to the pin 80. The second arm 77 is rotated in the clockwise direction relative to the shaft 78. As the ring 58 rotates further, the lower end portion of the pin 81 being guided by the guide surface 79*a* enters the arcuate slot 89 formed in the chassis 51 along the outer periphery of the revolving ring 58 through the opening of the slot. The pin 81 is, at this time, guided by the side walls of the slot 89 to move together with the revolution of the ring 58, separating from the above mentioned arcuate guide surface 79*a*.

Figure 7:
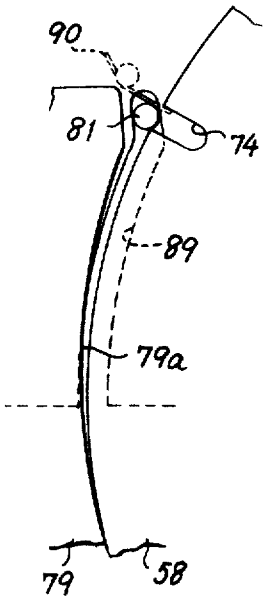

As the revolving ring 58 rotates until the cutout 74 reaches the position indicated by a two-dot chain line in FIG. 1. The pin 81 is guided by the bent slot part 89*a* of the arcuate slot 89 and is moved outward in the radial direction of the ring 58. The pin 81 thereby leaves from the open end of the cutout 74 and fits into the inner part of the bent slot part 89*a*, against the spring force of a torsion spring 90 as indicated in FIG. 7. When the ring 58 further rotates slightly from the above mentioned position, the pin 81 is completely extracted out of the cutout 74 and is pressed against the outer peripheral edge of the ring 58 by the torsion spring 90 and is locked within the bent slot part 89*a*. During the second half portion of the revolution of the revolving ring 58, up to the above mentioned position, the first arm 76 is rotated clockwise. The second arm 77 is rotated counterclockwise and placed in the state indicated by a two-dot chain line in FIG. 1.

The first and second arms 76 and 77 are rotated counterclockwise with respect to the shaft 80 interrelatedly with above described revolution of the revolving ring 58 as they change their folded state. The guide pole 21 fixed to the upper part of the distant end of the second arm 77, as it is extracted out through the opening 17 of the cassette 10, intercepts and engages the magnetic tape 16 uniformly over its entire width. Then, as the revolving ring 58 revolves clockwise, it draws the tape out of the cassette 10 in the horizontal direction. When the pin 81 is locked within the bent slot part 89*a*, a tape loop 16*a* of approximately triangular shape is formed in the plane of the cassette 10, as indicated by two-dot chain line in FIG. 1.

Thereafter, the revolving ring 58 continues revolving by itself. This ring 58 is orientated with an inclination, such that its lowermost position confronts the lower side position of the cassette, as shown in FIG. 3. The tape guide pole 85, the pinch roller 86, the guide pins 82*a*, 82*b* and 82*c*, and like parts enter the above mentioned triangular tape loop 16*a* from below, and rise as the ring 58 revolves. Consequently, the leading tape guide pole 85, comes out of the tape loop 16*a*, intercepts the magnetic tape 16 and pulls it around as the ring 58 revolves. The tape is wrapped around the cylindrical peripheral surface of the guide drum 50. At this time, the upper guide drum 50*a* is being driven at high rotational speed by the motor 41. A thin air film is formed between this upper guide drum 50*a* and the magnetic tape 16 wrapped therearound. Thus, the above mentioned pulling around of the tape 16 can be accomplished with relative ease.

Next, this tape pulling around action will be described with reference particularly to FIG. 5. The pinch roller 86 is rotatably supported on a shaft 91 fixed to the pinch roller support lever 84 at approximately the middle part thereof and is adapted to be adjustable in position. The tape guide pole 85 is held between two arms 93*a* and 93*b* of a yoke-like tape guide 93 pivotally supported on a pivot pin 94. Tape guide 93 pivots within limits set by a cutout 92*a* at the upper part of a bent part 92 at the end of the support lever 84. When the tape guide pole 85 is moving within the tape loop 16*a* and not engaging the magnetic tape 16, the tape guide 93 is turned counterclockwise by the force of gravity and is limited in rotation in the state indicated in FIG. 5.

The tape guide 93 is inclined forwardly when it engages the magnetic tape 16 being drawn out in the horizontal direction from the cassette 10. A part of the upper arm 93*a* first strikes the magnetic tape 16. Then, the tape guide 93 is automatically turned so that the guide pole 85 engages the tape 16 uniformly over its entire width and is caused to assume the state indicated by single-dot chain line in FIG. 5.

In order to wrap the magnetic tape 16 helically around the cylindrical surface of the guide drum 50, the tape guide pole 85, intercepts the tape. It pulls around of the tape interrelatedly with the revolution of the revolving ring 58. The tape revolves around the guide drum 50. At the same time, it is once displaced upward and then displaced downward again. During the operation, the magnetic tape 16 drawn out horizontally from the cassette is pulled around as it is displaced upward. The tape is held at its lateral edges by the arms 93*a* and 93*b* of the tape guide 93 and thereby prevented from separating and disengaging from the guide pole 85.

Furthermore, during this operation of pulling around the tape 16, a tension force is produced on its lower lateral edge. Consequently, the tape engages the tape guide pole 85 with a non-uniform tension, in the tape width direction. However, since the guide pole 85 is adapted to rotate freely within a certain range together with the tape guide 93, the guide pole 85 is automatically turned in the direction required to correct this non-uniform tension. Thereafter, the tape is engaged uniformly over its entire width with the guide pole 85.

Figure 5:
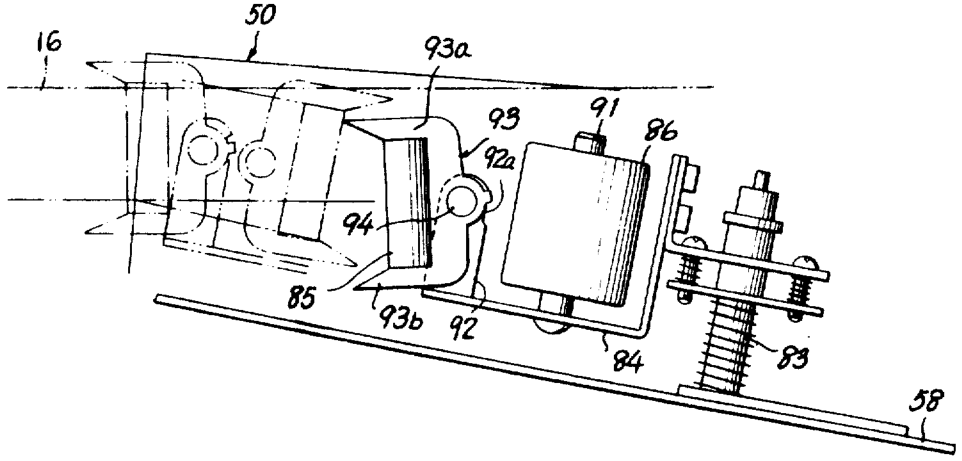
FIG. 5 is a side view showing one example of a tape engaging and guiding mechanism in the apparatus of the instant example.

When the tape guide 93 moves to the reverse side of the guide drum 50, as viewed in FIG. 5, interrelatedly with the revolution of the revolving ring 58 as indicated by two-dot chain line in FIG. 5, it is displaced downwardly. The tape 16 is engaged by the guide pole 85 and is pulled around the periphery of the guide drum 50. At the same time, it is displaced downward. During this pulling around operation, a tension force is produced in the upper edge of the tape 16 which is opposite to the nonuniformity described in the previous paragraph. The tape guide 93, however, is rotated in a manner to correct the locally produced tension force. Thereafter, the tape 16 is again engaged substantially uniformly over its entire width, by the guide pole 85.

As described above, in the case where the tape 16 is pulled around in a helical shape, a difference develops in the tape tensions at either the upper edge, or the lower edge of the tape. The tape guide pole 85 changes its inclination in the direction for correcting this tape tension difference. Thereafter, the tape tension is uniform over its entire width. Accordingly, the tape is subjected to substantially uniform tension over its entire width. Deleterious results such as stretching on only one side of the tape are prevented. Furthermore, this tension correcting action of the guide pole 85 also occurs when the tension relative to the width direction of the tape varies abruptly because of collision of an object such as a lever with the tape 16, as it is drawn out of the cassette 10 during loading operation.

The revolving ring 58, by means of the tape guide pole 85, engages the magnetic tape 16. It revolves pulling the tape around along the peripheral surface of the guide drum 50 as described above, until it reaches a point slightly short of the final rotary position indicated in FIG. 2. A projection (not shown) on the lower surface of the ring 58 strikes against the aforementioned bent loading lever 60 disposed in its operative position, whereupon this loading lever is rotated clockwise. Consequently, the revolving ring drive mechanism is placed in the state indicated in FIG. 4B. Thereupon, the gear 61 disengages from the gear 62, and the transmission of driving power from the capstan 45 to the drive roller 57 is terminated. Therefore, the capstan 45 thereafter rotates singly by itself without any special load whatsoever.

The revolving ring 58 is no longer supplied with driving power. It is limited in rotation at the position indicated in FIG. 2, at which the roller 75 pressing against the outer periphery of the revolving ring has engaged with the V-shaped notch 72. As a result of the rotation of the ring 58 to its final position, a microswitch (not shown) is closed. The apparatus is thereby changed over to the recording or reproducing operational mode. In addition, a solenoid (not shown) operates to actuate a pinch roller pressing lever 95 in clockwise rotation. The pinch roller 86 is engaged by the pinch roller shaft and rotates together with the supporting lever 84, thereby pressing the tape 16 against the capstan 45. Consequently, the tape 16 is clamped between the pinch roller 86 and the already rotating capstan 45, thereby beginning to travel under driving power.

Furthermore, as another result of the rotation of the pressing lever 95 of the above mentioned operative position, this rotation is transmitted through a rod (not shown) to move a stop member 96 toward the left thereby to release a takeup-side tension lever 97. Consequently, the tension lever 97 rotates slightly counterclockwise against the force of a spring 99 in accordance with the tape tension detected by a tension pole 98 fixed to one end of the tension lever 97. At the same time, a brake shoe 100 of the other end presses against the takeup reel disc 18. A tension servomechanism on the takeup side is rendered operative.

The magnetic tape is guided by the guide pin 13 from the tape supply roll 11 within the cassette 10. The tape is paid out of the cassette, when the apparatus is in the recording or reproducing mode. A constant tape tension is maintained on its supply side by the tension pole 20 operating cooperatively with the brake band 37. The tape is guided by a guide pole 101 to be drawn across a full-ereasing head 102. For recording, erasure is carried out across the full width of the tape. The tape is then wrapped in a helical shape around the peripheral surface of the guide drum 50 and over a specific angular range within limits determined by guide poles 103 and 104. Recording or reproducing of video signals is carried out on the tape by a video head (not shown). The tape is further drawn across a head block 105 disposed with an inclination, where recording or reproducing of audio and control signals is carried out. The tape is then clamped between and driven by the capstan 45 and the pinch roller 86. The tape advancing direction is reversed by the tape guide pole 85. The tape is then guided to guide pins 82*a*, 82*b* and 82*c* on the opposite side of the pinch roller 86. After passing by the guide pole 21, which is being locked, a constant tape tension is maintained on the takeup side by the tension pole 98 as it reenters the cassette 10, in which the tape is guided by the guide pin 14 to reach the takeup tape roll 12. A torque urges tape roll 12 to rotate in the tape takeup direction.

The unloading operation carried out by stopping control of the apparatus according to the invention is as follows. At the time of a stop control, a stop button 106*b* is pushed. A solenoid 107 operates, and the control lever 24 is released from its locked state and is returned to its original position indicated in FIG. 1. As a result of the return of the control lever 24, the lock lever 28 and the tension lever 31 are rotated counterclockwise. The tension pole 20 returns to its original position within the cassette 10, through the opening 17. As another result of the pushing of the stop button 106*b*, the pressing lever 95 rotates counterclockwise. It is thus returned to its original position indicated in FIG. 1. The pinch roller 86 separates away from the capstan 45, whereupon the tape 16 stops travelling under the clamping and driving action of the pinch roller 86 and the capstan 45.

Interrelatedly with the return movement of the control lever 24, the operation lever 52 rotates counterclockwise through a specific angle. The rotation of the loading lever 60 is limited at its disengaged position. On one hand, the unloading lever 59 is unlocked and is rotated clockwise by the force of a spring 108. Consequently, a gear 109 at the distant end of the unloading lever 59 meshes with both the gear 62 and a gear 110. The revolving ring drive mechanism is placed in the stage indicated by full line in FIG. 4B. Accordingly, clockwise rotation of the capsten 45, differing from that at the time of loading operation, is transmitted as a counterclockwise rotation to the drive roller 57 pressed against the inner rim of the revolving ring 58 by way of gears 62, 109, 110 and 63. Consequently, the revolving ring 58 begins to revolve in the counterclockwise direction. The roller 75 disengages the V-shaped notch 72 and presses against the outer peripheral rim of the revolving ring.

At this time, the drive roller 43 is held in a position to press against the takeup reel disk 18, which is under a torque urging it to rotate in the tape takeup direction. For this reason, when the revolving ring 58 revolves in the counterclockwise direction, the magnetic tape 16 being drawn out of the cassette 10 is wound around the takeup tape roll 12 without slackening. The revolving ring 58 revolves through approximately one-half revolution. The tape 16 is released from its engagement by the guide pole 85 and is formed into the tape loop 16*a* of substantially triangular shape, as indicated by a single-dot chain line in FIG. 1, and is engaged by the locked guide pole 21.

The revolving ring 58 revolves further in the counterclockwise direction. The U-shaped cutout 74 reaches the position indicated by the two-dot chain line in FIG. 1. The pin 81, which is limited in movement within the bent slot part 89*a* is pressed against the outer periphery of the ring 58 by forces such as the spring force of the torsion spring 90 and the tape tension, and is pressed into the notch 74. Thereafter, the pin 81 moves, being guided by the arculate slot 89 and the arcuate guide surface 79*a* of the bracket 79, together with the revolution of the ring 58. The first and second arms 76 and 77 change their bent configuration and, as a whole, are rotated in the counterclockwise direction.

When the revolving ring 58 revolves to a position slightly short of the terminal rotational position indicated in FIG. 1, a projection 111 on the lower surface of the ring 58 strikes against the unloading lever 59 in its operative position. The unloading lever 59 is rotated to the position indicated by the two-dot chain line in FIG. 4B. Consequently, relative to the revolving ring drive mechanism, the gear 109 is released from its meshed state with the gear 62. The transmission of driving power from the capsten 45 to the revolving ring 58 is terminated.

The revolving ring 58, which is no longer driven, is limited in its revolution at the position indicated in FIG. 1. There, the roller 75 pressing against outer peripheral edge of the ring fits into the V-shaped notch 71. As a result of the rotation of the ring to this position, the first and second arms 76 and 77 move from their positions shown in FIG. 2 to those indicated in FIG. 1. The guide pole 21 enters the cassette 10 through the opening 17 to return to its original position. Furthermore, the magnetic tape 16 forming the tape loop 16*a* is taken up on the tape takeup roll 12 and is thereby completely housed within the cassette 10. Thus, the various mechanisms are changed from their respective states shown in FIG. 2 to those indicated in FIG. 1. The unloading operation is completed.

Figure 4A:
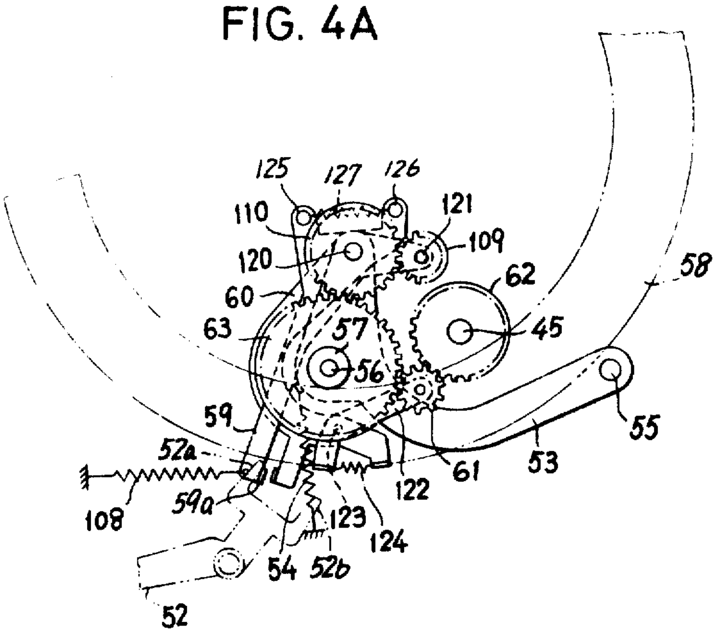
FIGS. 4A and 4B are plan views showing one example of a mechanism for driving a revolving ring in the apparatus shown in FIG. 1 and respectively indicating the states of the mechanism at the time of loading and at the time of unloading.
Figure 4B:
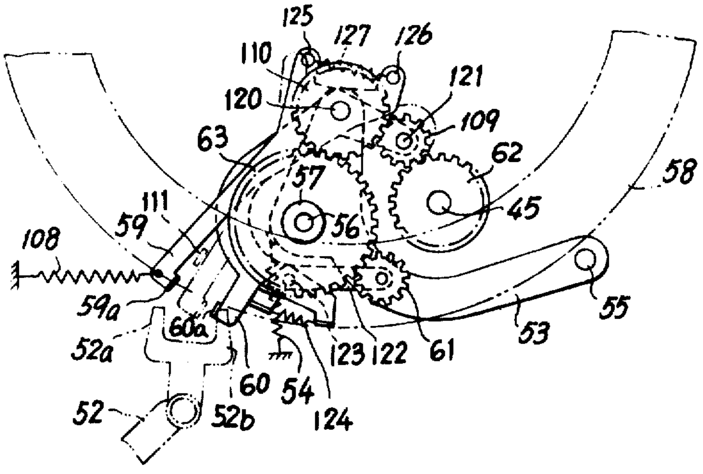

Next to be described is the organization and operation of the revolving ring drive mechanism, which imparts a clockwise torque and a counterclockwise torque to the revolving ring 58 respectively for loading operation and unloading. Reference is made to FIGS. 4A and 4B, which respectively indicate the states of this drive mechanism for the two operations.

In both FIGS. 4A and 4B, both the unloading lever 59 and the curved loading lever 60 are rotatably supported independently on a pivot pin 120 fixed to the holding lever 53. Furthermore, the gear 110 is rotatably supported on the pin 120 and is meshed with the gear 63 formed unitarily with the drive roller 57. The gear 109 is rotatably held by a pivot pin fixed to the distant end of the unloading lever 59 and is meshed with the gear 110. For this reason, when t he lever 59 is rotated, the gear 109 revolves around the gear 110 as it revolves about its own axis.

A lever 122, rotatably connected by a shaft 123 with respect to the loading lever 60, supports at its free end a gear 61. A tensioned spring 124 causes lever 122 to impart a counterclockwise torque to the loading lever 60. The gear 61 is positively meshed with the gear 63. Accordingly, when the loading lever 60 rotates, the gear 61 revolves around the gear 63 as it rotates about its own axis. Furthermore, since a spring 127 is stretched between pins 125 and 126 fixed to the unloading lever 59 and the loading lever 60, respectively. Torques urge these levers 59 and 60 to rotate toward their respective operational positions.

In the loading mode of operation indicated in FIG. 4A, the unloading lever 59 at its bend part 59*a* is engaged by one arm 52*a* of the operation lever 52 rotating in the clockwise direction. It is thereby limited in rotation at its disengaged position. The gear 109 is separated from the gear 62. The loading lever 60 without being limited in rotation is rotated counterclockwise by the tension force of the spring 127. The gear 61 revolves around the gear 63 as it rotates about its own axis and is meshed by the gear 62. Consequently, the clockwise rotation of the capstan 45 is transmitted by way of the gears 62, 61, and 63 and to th drive roller 57 as a clockwise rotation. The revolving ring 58 is thereby rotated in the clockwise direction.

In the unloading mode of operation indicated in FIG. 4B, the operation lever 52 is rotating counterclockwise. The loading lever 60, at its bent part 60*a* is engaged by the other arm 52*b* of this operation lever 52 and is limited in rotation at its disengaged position to which it has rotated in the counterclockwise direction. The gear 61 is separated from the gear 62. On one hand, the unloading lever 59, without being limited in rotation, is rotated clockwise by the tension force of the springs 99, 127 and 108. The gear 109, as it rotates about its own axis, revolves around the gear 110 and is meshed by the gear 62. Consquently, the clockwise rotation of the capsten is transmitted by way of the gears 62, 109, 110 and 63 to the drive roller 57 as a counterclockwise rotation, whereby the revolving ring 58 is driven in counterclockwise revolution.

In the above described mechanism, when it is in the recording operational mode after completion of loading operation, the unloading lever 59 and the loading lever 60 are both limited in rotation in their disengaged positions as described above. The gears 61 and 109, for transmitting the driving power for driving the revolving ring 58, are both separated from the driving gear 62. Consequently, in the recording or reproducing mode of operation, the driving gear 62 rotates independently without being subjected to any additional load whatsoever. The recording or reproducing operation is accomplished without any abnormality.

In the above described embodiment, the drive mechanism is so adapted that the rotation of the capstan 45 is utilized to drive the revolving ring 58 in clockwise and counterclockwise rotation. The driving power source is not necessarily limited to the capsten. Other driving sources, such as the reel disc driving means and the guide drum driving means, for example, may also be utilizable for this purpose.

In the above described driving mechanism, the loading and unloading operations by the revolving ring 58 are accomplished by utilizing the rotational power of the capsten 45 driven by the capstan motor 40. There is no necessity of providing a driving power source exclusively for loading, such as a separate motor used exclusively for loading in the apparatus illustrated in FIG. 1. Accordingly, the apparatus can be made with minimal size and with simple organization.

Another feature of the above described driving mechanism is that, for the loading and unloading operations, the clockwise and counterclockwise revolving operations of the revolving ring can be accomplished without changing the rotational direction of the driving power source. For this driving power source, moving parts such as the capstan and the guide drum, which rotate in only one direction, can be utilized.

If the magnetic tape 16 being drawn out of the cassette 10 temporarily slackens during the loading or unloading operation, it is prevented from being caught on any of the various parts on the chassis 51 by the mechanism described below.

A protector plate 130, which has the shape, substantially, of the latter C and has a smooth upper surface, is provided around the guide drum 50. It is mounted at a position above and separated by a specific distance from the revolving ring 58 and with the same inclination as the ring 58 as illustrated in FIG. 3. Furthermore, this protector plate 130 has a shape such that, as indicated in FIGS. 1 and 2, it is close to the guide drum 50 particularly in the region thereof where the magnetic tape 16 is wrapped therearound. Plate 130 extends in a manner to cover the lower surface facing the tape loop successively formed by the magnetic tape 16 as it is drawn out of the cassette 10 at the time of loading. Of the constituent parts disposed on the inner side of the revolving ring 58 and mounted on the chassis 51, those which project above the protector plate 130 are limited to the guide poles 101, 103 and 104, the full-width erasing head 102, a head block 105, and the capstan 45, which are in contact with the tape 16 at the time of recording or reproducing.

Figure 8:
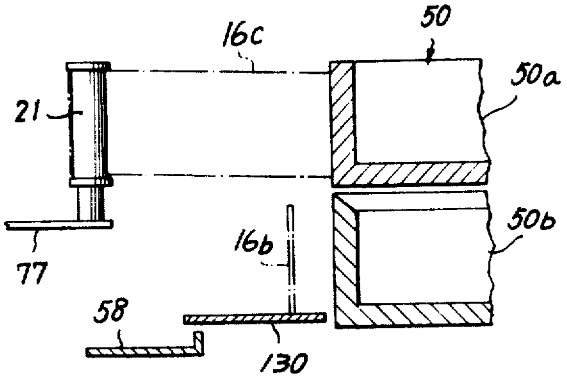
FIG. 8 is a vertical section taken along the line VIII — VIII in FIG. 2 and viewed in the arrow direction.

Dukring loading operation, the magnetic tape 16 being drawn out of the cassette 10 forms the tape loop 16*a* shown by two-dot chain line in FIG. 1. The tape is paid out excessively from the cassette 10 by the tape drawing out force of the guide pole 21, and a slack 16*b* in the tape is formed. Consequently, the part of slackened tape 16*b* sags toward the chassis. However, as indicated in FIG. 8, the lower edge of this sagging tape is intercepted by the upper surface of the protector plate 130. The tape is prevented from contacting any of the various parts provided on the chassis 51. The tape 16*b* which has dropped onto the protector 130 is engaged by the tape guide pole 85 when the loading operation is thereafter continued and is tensioned to assume the state designated by 16*c* in FIG. 8. Thereafter, the tape pulling around operation is carried out without any obstruction or trouble.

Another state of tape slackening as designated by 16*d* in FIG. 1 may occur. This slackening occurs in the case where, at the time of unloading, the take up reel disc 18 does not rotate, or the rotational torque is weak, and the action of taking the tape 16 into the cassette 10 is slow. Still another state of tape slackening, as designated by 16*e* in FIG. 2, occurs in the case where, when the loading operation is substantially completed, the tape 16 has an irregularity such as wrinkles on its surface. They stick to the upper guide drum 50*a* rotating at high speed, and driving power is imparted by this upper guide drum 50*a* to the tape. A further state of tape slackening as designated by 16*f* in FIG. 1 occurs if, at the time of recording or reproducing, the tape 16 which has been reversed in travel direction by the tape guide pole 85 sticks to the pinch roller 86.

In each of these cases of tape slackening, the protector plate 130 engages the slack tape, similarly as in the aforedescribed case. The plate prevents the sagging tape being caught by any of the various parts on the chassis 51.

In the apparatus of the above described embodiment, the protector 130 is provided on only the inner side of the revolving ring 58. It is preferable, when a ring of small width dimension is used, to provide protector plates on both the inner side and outer side of the narrow ring.

Next, the control and operation of rewinding and fast forward running in the apparatus of the invention will be described. These operations are carried out with the magnetic tape 16 in its stored state within the cassette 10 as shown in FIG. 1. For rewinding control, the control lever 24 is manipulated clockwise to press the rewind roller 44 against the supply reel disc 19. Since the rewind roller 44 is rotating clockwise at this time, it imparts a counterclockwise torque to the supply reel disc 19 upon being thus pressed thereagainst. Rewinding of the tape 16 is then carried out. For fast forward running, the control lever 24 is manipulated to turn clockwise in the same manner as in play control thereby to press the drive roller 43 against the takeup reel disc 18. A fast toward button 106*a* is pressed to hold the operation lever 52 in the position indicated in FIG. 4B. Then, with the apparatus in a state wherein the loading operation with respect to the tape 16 is stopped, the tape fast forward running operation is carried out.

The above mentioned fast forward button 106*a* is arranged in a row at the front of the apparatus together with other control buttons 106*b*, 106*c* and 106*d*. The control button 106*d* is that for audio recording.

Figure 9:
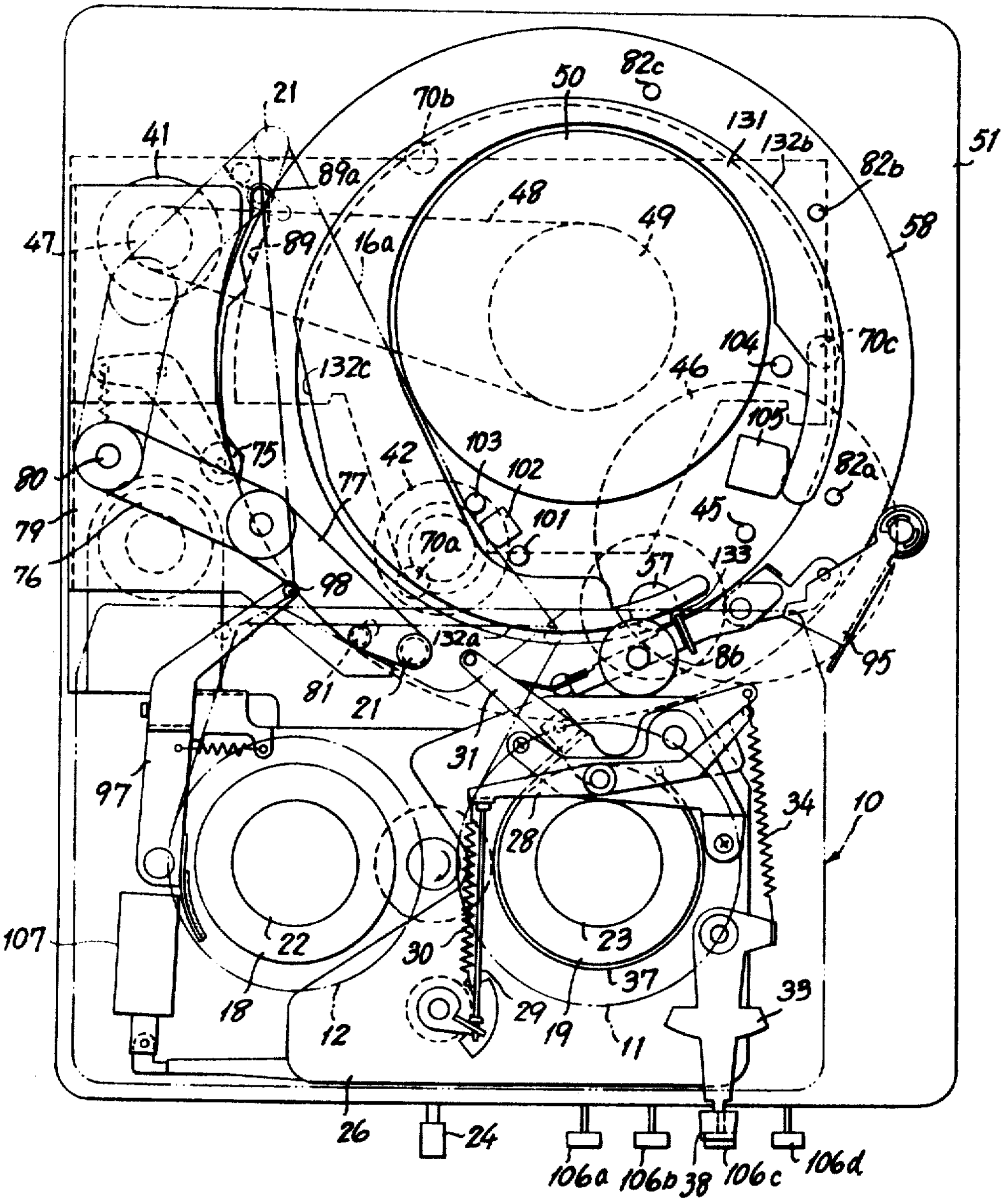
FIG. 9 is a plan view showing another embodiment of the recording and reproducing apparatus of automatic tape loading type (according to this invention) shown in the state prior to tape loading.

Another embodiment of the automatic tape loading type, recording and/or reproducing apparatus according to the invention will now be described with reference to FIG. 9. Those parts which are the same as those in the apparatus illustrated in FIGS. 1 through 8 are designated by like reference numerals, and a detailed description thereof is not repeated.

A guide member 131 for the pinch roller support lever is mounted in a manner similar to that of the protector plate 130 in the apparatus illustrated in FIG. 1. It has substantially the same shape as the protector plate 130. This guide member 131 covers the chassis surface between the guide drum 50 and the revolving ring 58. At the same time, it has an end part extending to a position to confront the lower side of the head block 105. The guide member is further provided at its outer peripheral surface with arcuate guide surfaces 132*a* and 132*b* and at its part confronting the bracket 79 with a straight-line guide surface 132*c*.

On one hand, the pinch roller supporting leber 84 is urged to rotate clockwise relative to the pivot pin 83 by a torque due to a torsion spring (not shown). A pole 133 fixed to the side of the lever 84 is limited in rotation at a position where the guide member 131 contacts the guide surface 132*a*.

For play control, the control lever 24 is turned counterclockwise. The revolving ring 58 is driven by the drive roller 57 to begin clockwise revolution in the same manner as in the apparatus of the preceding embodiment. As one result of the revolution of the revolving ring 58, the first and second arms 76 and 77 rotate as a whole in the clockwise rotation as they change their folded state until they are locked at the angular positions indicated by two-dot chain line in FIG. 9. The magnetic tape 16 is engaged by the guide pole 21 and drawn out of the cassette 10 to for a tape loop 16*a* of approximately triangular shape as indicated by two-dot chain line in the same FIG. 9.

As another result of the above mentioned revolution of the revolving ring 58, the lever 84 supporting the tape guide pole 85 and the pinch roller 86 moves together with the ring 58. The pole 133 is first guided by the arcuate guide surface 132*a*, and enters into the above mentioned tape loop 16*a*. When the tape guide pole 85 enters to approximately the central part of the tape loop 16*a*, the pole 133 is this time guided by the straight-line guide surface 132*c*. The pinch roller support lever 84 is rotated gradually in the counterclockwise direction relative to the shaft 83 in accordance with the revolution of the ring 58. As the revolving ring revolves further, the tape guide pole 85 in the lead engages the tape 16 when withdrawing out of the tape loop 16*a*. Thereupon, the tape 16 is pulled around as it is wrapped around the peripheral surface of the guide drum 50. In this tape pulling around action, the pole 133 is guided by the arcuate guide surface 132*b* of the guide member. The pinch roller supporting lever 84 is in a state wherein it is held at a position to which it has been rotated counterclockwise relative to the pin 83 from its initial state. It moves together with the revolving ring 58.

When the revolving ring 58 revolves to a position slightly short of the position for completion of loading, as the guide pole 85 after engaging the tape 16 pulls it around, the pole 133 is released from its engagement with the guide surface 132*b*. The pinch roller supporting leber 84 is rotated clockwise by a torsion spring (not shown). Since the pinch roller 86 at this time has already passed by the head block 105 and is at a position confronting the capstan 45, it is pressed against the capsten 45 over the magnetic tape 16 interposed therebetween, responsive to the above mentioned clockwise rotation of the lever 84. In this connection, the resilient spring force of the spring (not shown) for imparting a clockwise torque to the lever 84 is set at a value of an order such that the magnetic tape 16 is not driven upon being clamped by the pressing of the pinch roller 86 against the capstan 45.

When the revolving ring 58 revolves up to the terminal position, the pinch roller pressing lever 95 is turned clockwise similarly, as in the apparatus illustrated in FIG. 1. The pinch roller 86 is pressed with a large pressing force against the capsten 45, whereby the magnetic tape 16 is clamped and driven to begin travelling. Thus, the apparatus is placed in the reproducing mode.

The unloading operation is accomplished by the revolution of the revolving ring 58 in the counterclockwise direction to the original position. During this operation, the pinch roller supporting lever 83 moves together with the ring 58, the pole 133 being guided successively by the arcuate guide surface 132*b*, the straight-line guide surface 132*c*, and the arcuate guide surface 132*a* of the guide member 131.

If, for some reason, a slack develops in the magnetic tape 16 being drawn out of the cassette 10 during loading or unloading in the above described apparatus, and this tape part sags, it will be engaged by the upper surface of the guide member 131. Accordingly, the slack tape in such a case will not be caught by any of the parts mounted on the chassis or be a cause of malfunctioning.

In the loading operation of the above described apparatus, the tape guide pole 85 and the pinch roller 86 move in a path differing from path of revolution of the revolving ring and are positioned within the inner side of the revolving ring 58 to enter into the triangular tape loop 16*a*, thereafter moving together with the ring 58 while moving outwrd. Accordingly, the triangular loop 16*a* at the time of loading operation can be made relatively small, whereby the apparatus can be made small.

Further, this invention is not limited to these embodiments but various variations and modifications may be made without departing from the scope and spirit of the invention.

What I claim is:

1. An automatic tape loading mechanism for a recording and/or reproducing apparatus comprising:

a. a cylindrical tape guide means having at least one rotating head associated therewith;

b. a ring-shaped means rotatably supported to encircle said tape guide means;

c. means for rotating a shaft in one direction;

d. roller means for driving said ring-shaped means;

e. first transmitting means for pressing said roller means against a rim of said ring-shaped means and transmitting the torque of said rotating shaft to said roller means to turn said ring-shaped means in a specific direction during a loading mode;

f. tape drawing out and guiding means separate from said ring-shaped means for drawing a tape out of a housing structure by engaging with said ring-shaped means and moving interrelatedly with the turning of said ring-shaped means during the loading mode;

g. means for locking the engagement of said tape drawing out and guiding means with said ring-shaped means while said ring-shaped means turns through a predetermined angle, said locking means disengaging said tape drawing out and guiding means from said ring-shaped means at a position which said ring-shaped means reaches after turning through the predetermined angle and locking said tape drawing out and guiding means at a position which is disengaged from said ring-shaped means;

h. tape pulling around and guiding means mounted on said ring-shaped structure and moving together therewith for intercepting the tape drawn out by said tape drawing out and guiding means and for pulling the tape to wrap it around the peripheral surface of said cylindrical tape guide means, with the wrap engaging the cylindrical tape guide over a specific angularly extent thereof;

i. means responsive to the completion of the wrapping of the tape around the guiding means for stopping the rotation of said roller means; and j. second transmitting means for transmitting the torque of said rotating shaft to said roller means to rotate said ring-shaped means in a direction opposite to the specific direction during an unloading mode.

2. An automatic tape loading mechanism according to claim 1 wherein said shaft comprises a capstan for moving the loaded tape.

3. An automatic tape loading mechanism according to claim 1 wherein said tape pulling around and guiding means includes a tape engaging member for engaging the tape drawn out by said tape drawing out and guiding means and for pulling the tape around the peripheral surface of said cylindrical tape guide structure in a helical state; and means for holding said tape engaging member comprising a pivot pin rotatably mounted within a specific angular range, whereby said tape engaging member engages with the tape with uniform tension over the width of the tape.

4. An automatic tape loading mechanism according to claim 1 further comprising tape protecting means disposed in a position below and confronting the path formed by the tape during loading, recording or reproducing, and unloading, said tape protecting means engaging on its upper surface any slack in the tape to protect the tape.

5. An automatic tape loading mechanism according to claim 1 further comprising a guide means disposed along said ring-shaped means and having a guide surface part not following the path of said ring-shaped means as it turns and force applying means for applying a displacing force to the tape pulling around and guiding means on said ring-shaped means, said displacing force acting in a direction which causes the same to contact said guide means, said tape drawing out and guiding means moving interrelatedly with the rotation of said ring-shaped means at the time of loading and unloading operation in a path differeing from the rotational path of said ring-shaped means along the guide surface of said guide means.

6. An automatic tape loading mechanism according to claim 5 wherein said guide means is also disposed in a position below and confronting the path formed by the tape during loading, recording or reproducing, and unloading, and said guide means engaging on its upper surface any slack in the tape to protect the tape.

7. An automatic tape loading mechanism according to claim 1 wherein said locking means comprises an engagement pin integrally mounted on said tape drawing out and guiding means; a cutout recess formed in said ring-shaped means for receiving and holding said engagement pin; guide means for guiding said engagement pin while it is held in said cutout recess and moved together with said ring-shaped means as it turns through the predetermined angle and for disengaging said engagement pin from said cutout recess after said ring-shaped means has turned through the predetermined angle; said engagement pin being disengaged from the cutout recess of said ring-shaped means within the portion of said guide means and being restricted from disengagement out of said portion of said guide means by the peripheral surface of said ring-shaped means.

8. An automatic tape loading mechanism according to claim 7 wherein said guide means comprises a structure having a slot through which said engagement pin is guided, said slot having an arcuate part and a part bent from the arcuate part, the arcuate part being disposed along the periphery of said ring-shaped means over the predetermined angle, the bent part being spaced apart from the periphery of said ring-shaped means, said engagement pin being held in said cutout recess and being guided by the arcuate part.

9. An automatic tape loading mechanism according to claim 7 wherein said tape drawing out and guiding means comprises a first arm member having a proximal base part rotatably supported at a specific position and a second arm member rotatably connected to the distant end of said first arm member and having at its end part the engagement pin and an engagement member for engaging the tape and drawing the tape out of the tape housing.

* * * * *